US006836836B2

(12) United States Patent
Shinozaki

(10) Patent No.: US 6,836,836 B2
(45) Date of Patent: Dec. 28, 2004

(54) MEMORY PROTECTION CONTROL DEVICE AND METHOD

(75) Inventor: Ikuo Shinozaki, Kanagawa (JP)

(73) Assignee: Sony Corporation, Tokyo (JP)

(*) Notice: Subject to any disclaimer, the term of this patent is extended or adjusted under 35 U.S.C. 154(b) by 67 days.

(21) Appl. No.: 10/221,912

(22) PCT Filed: Jan. 19, 2001

(86) PCT No.: PCT/JP01/00359

§ 371 (c)(1),
(2), (4) Date: Jan. 2, 2003

(87) PCT Pub. No.: WO02/057923

PCT Pub. Date: Jul. 25, 2002

(65) Prior Publication Data

US 2003/0126398 A1 Jul. 3, 2003

(51) Int. Cl.[7] .............................................. G06F 12/00
(52) U.S. Cl. ........................ 711/206; 711/163; 711/170
(58) Field of Search .......................... 711/163, 170–172, 711/200–221

(56) References Cited

U.S. PATENT DOCUMENTS 5,282,274 A * 1/1994 Liu ............................. 711/206

5,555,387 A * 9/1996 Branstad et al. ............ 711/209

FOREIGN PATENT DOCUMENTS

| JP | 64-17137 | * 1/1989 |
| JP | 1-125640 | 5/1989 |

* cited by examiner

Primary Examiner—Matthew D. Anderson
(74) Attorney, Agent, or Firm—Frommer Lawrence & Haug LLP; William S. Frommer

(57) ABSTRACT

The present invention provides a memory protective administrative apparatus for a computer for protecting memory access between programs. A virtual address administrative apparatus constituting the first mentioned apparatus receives size of a memory region prepared, and assigns a virtual address region larger than the size. At this time, a top address of a region smaller than size S1 covered by 1-entry of the minimum segment table performs virtual address assigning so as to be aligned to the size S1. In a region of size larger than the S1, hierarchies in which the size can be covered by 1-entry are searched from bottom, and likewise, a virtual address aligned is assigned. A page table is variable in length and has a page entry for a size part. The page table is linked to entry corresponding to the top virtual address of a segment table of a hierarchy used for alignment.

5 Claims, 5 Drawing Sheets

MEMORY PROTECTION CONTROL DEVICE AND METHOD

TECHNICAL FIELD

The present invention relates to a memory protective administrative apparatus and method for a computer for protecting memory access between programs, and particularly to the realization of process at exception of address conversion at real time, and the reduction in memory amount used for memory protective administration.

BACKGROUND ART

Since the memory protective administrative apparatus carries out process at exception of address conversion at real time, a tree-like hierocratical segment table is used as the procedure for searching a physical address with respect to a virtual address that an exception has occurred. By using the tree-like hierocratical segment table, it is possible to make search time finite length, and to suppress a memory using amount used by the memory protective device. Hereupon, the segment table is a table which holds a pointer to a next hierarchy or a pointer to a page table, and a flag showing that addresses below that hierarchy are null. The page table is a table comprising a virtual address at every size (page size) determined by the system and an entry holding the correspondence to a physical address.

The memory protective technique as described above has the problems as follows:

(1) In the preparation, deletion and memory using amount of the segment table, wasteful cost sometimes occurs. For example, even a memory region of only two pages, its page table sometimes belongs to two segment tables.

(2) As the memory region becomes large, necessary segment tables increase.

Further, in a case where a huge memory region like a frame buffer is protected in a procedure similar to a normal memory region, there poses a problem that the page table becomes huge, and the cost for preparing and deleting page table entries increases.

DISCLOSURE OF THE INVENTION

The present invention has been accomplished in consideration of the aforementioned circumstances. An object of the invention is to reduce the memory amount used for a segment table and a page table, and at the same time, to lower costs when memory regions are prepared or deleted.

It is a further object of the present invention to solve the problem that the size of a memory region of a page table becomes huge, that is, a problem that the size becomes large in proportional to the number of pages, in connection with a physically continuous memory region.

According to one aspect of the present invention, the following constitution is employed in order to solve the aforementioned objects. That is, as will be described in detail later with reference to FIG. 2, when a new memory region is prepared, the virtual address administrative apparatus receives size as input to assign a virtual address region above the size. At this time, a top address of a region smaller than size (indicated by S1) covered by one (1) entry of a segment tale of the minimum hierarchy assigns a virtual address so as to be necessarily aligned (making a multiple of certain number is called align) to the size S1. The virtual address is secured by the size S1 from the address aligned. During using the region, a portion larger than size actually used in the memory region is also not reused. With respect to regions of size larger than S1, hierarchies in which size can be covered by 1-entry are searched to assign the virtual address aligned similarly.

The page table is variable in length and has size of a region, and a page entry for a size part. The page table is linked to an entry corresponding to a top virtual address of a segment table in the hierarchy for align.

By the procedure mentioned above, as will be described later with reference to FIG. 3, a page table for a predetermined memory region is received without fail in one page table not depending on size. A region of large size is linked directly to a segment table of an upper hierarchy.

Since a top of an address covered by a segment table entry coincides with a top address of a memory region without fail, when addresses are searched, sizes are compared to discriminate whether or not the page is effective.

Since by the above-described procedure, the page table is prepared independently every memory region, when a memory region is owned jointly by a plurality of protective spaces, if a protective attribute is the same, one page table can be owned jointly. Even in a case where the protective attribute is different, in a case where the protective attribute is administered by a memory region unit, the protective attribute is not held every page but is held by a combination of a protective space and a memory region to enable holding in common.

Further, by the above-described procedure, with respect to a memory region comprising physically continuous pages, only a top physical address and size of a region are held as will be described later with reference to FIG. 5, it is not necessary to hold physical addresses for all pages in a page table as in a normal memory region. That is, the top virtual address is obtained from a position of a segment table linked. At exception of address conversion, a difference between an exceptional address and a top physical address are added to a top physical address to thereby obtain a corresponding physical address.

The aforementioned one aspect and other aspects of the present invention are defined in claims, and will be described in detail hereinafter with reference to the drawings.

BEST MODE FOR CARRYING OUT THE INVENTION

The concrete embodiments of the present invention will be described hereinafter with reference to the drawings.

Figure 1:
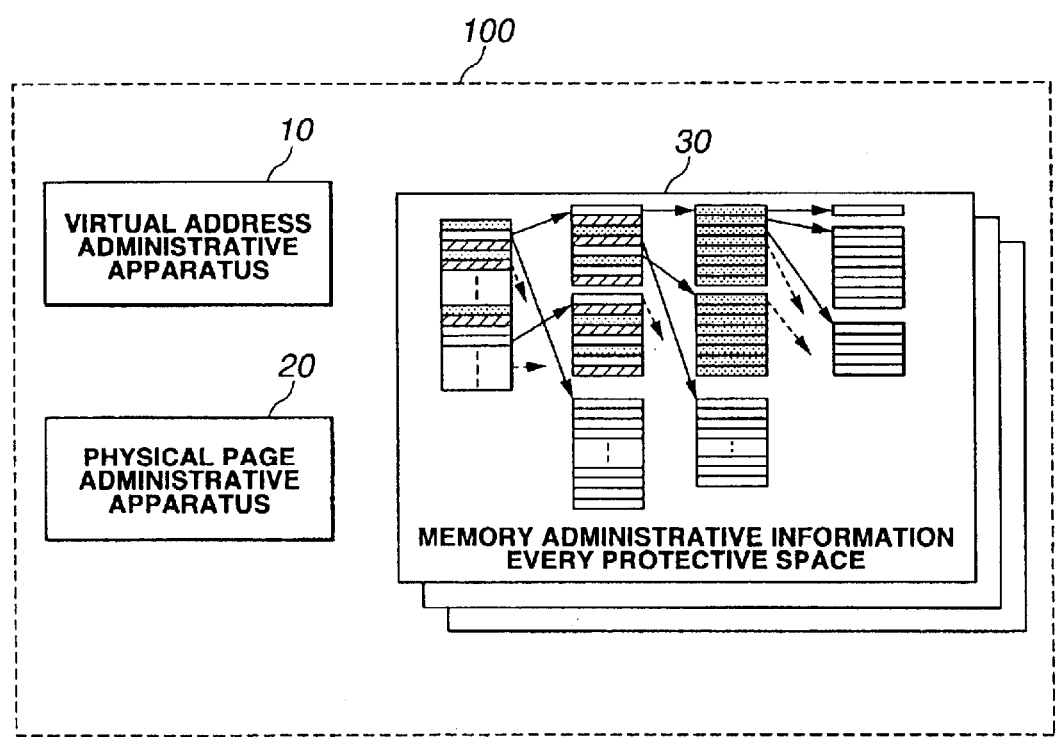
FIG. 1 is a view showing as a whole an outline of a memory system constituting the present invention.

FIG. 1 shows as a whole an outline of a memory protective administrative apparatus 100 of a computer to which the present invention is applied. In this figure, the memory protective administrative apparatus 100 comprises a virtual address administrative apparatus 10, a physical page administrative apparatus 20, and a memory administrative information holding part 30, the memory administrative information holding part 30 holding memory administrative information every protective space. The memory protective administrative apparatus 100 produces and deletes memory regions protected every protective space. When preparing memory regions, an unused virtual address for necessary size portion is acquired from the virtual address administrative apparatus 10, and a physical page of necessary size is acquired from the physical page administrative apparatus 20. A combination of the virtual address and the physical page acquired is held on the memory administrative information holding part 30 as memory administrative information every protective space. At exception of address conversion, whether or not a predetermined virtual address can be accessed is investigated in a predetermined address space in accordance with the information. If can be accessed, conversion to the corresponding physical address is carried out.

Figure 2:
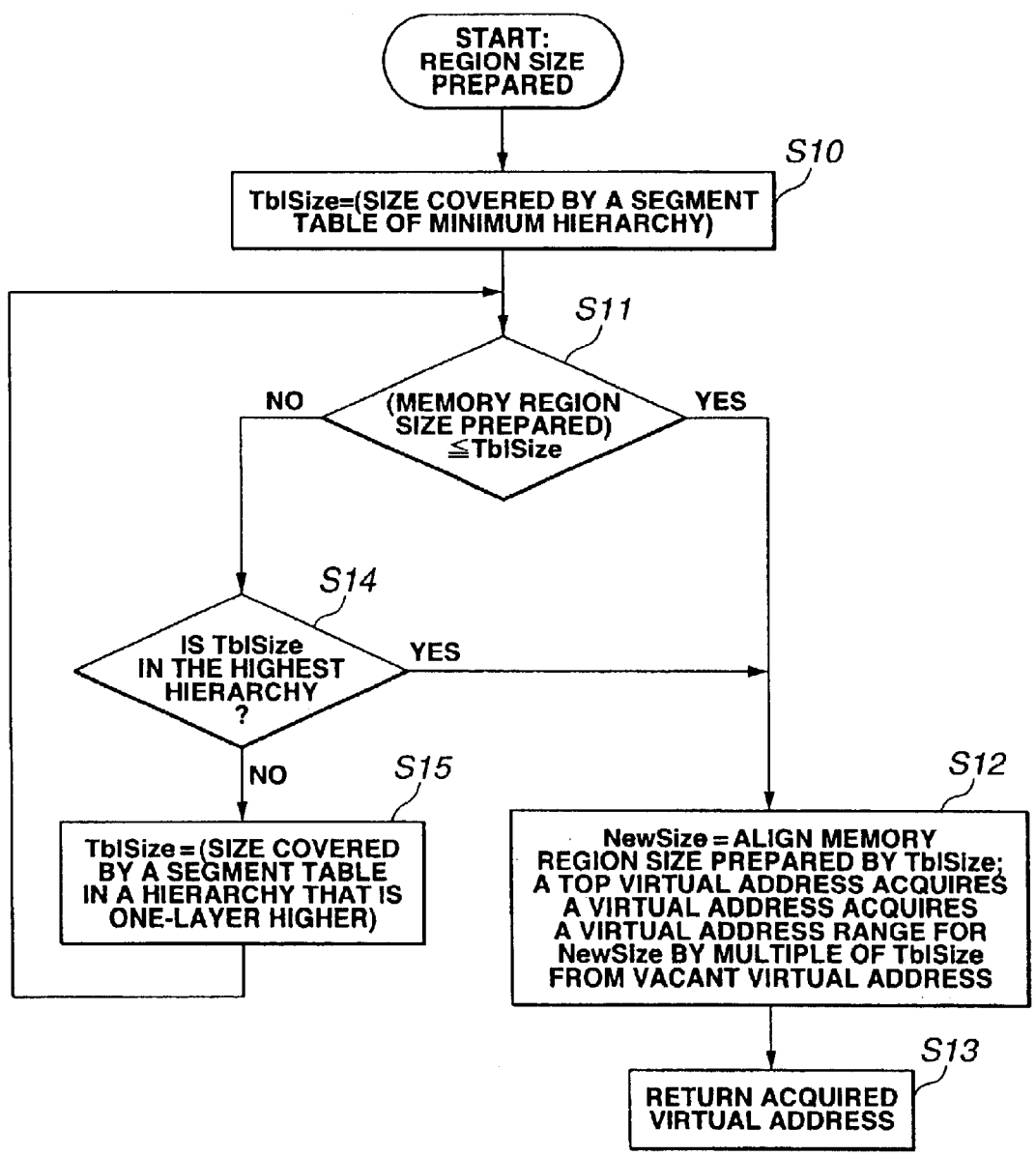
FIG. 2 is a flowchart for explaining process when a virtual address is assigned.

In the present embodiment, assigning of a virtual address and assigning of a physical page explained referring, particularly, to the drawings of FIG. 2 and thereafter are carried out whereby memory capacity necessary for holding memory administrative information every protective space can be reduced, and at the same time, process at exception of address conversion can be carried out at real time.

FIG. 2 shows a process when a region is produced. While in this example, a segment table is of a multi-hierarchy, it is noted of course that a single segment table may be used. In FIG. 2, table size (Tbl Size: size covered by 1 entry of a segment table) is set to size covered by 1 entry of a segment table of a minimum hierarchy) (Step S10).

Next, discrimination is made whether or not size of a memory region prepared is smaller than table size (Step S11). If in Step S11, the discrimination is affirmative, memory region size prepared (New Size) is aligned by table size. That is, a top virtual address acquires a virtual address range for New Size by multiple of table size from a vacant virtual address (S12). Thereafter, the acquired virtual address is returned (S13). Thereafter, a physical page of necessary size is acquired. A combination of the virtual address and the physical address acquired is held as memory administrative information every protective space. At exception of address conversion, whether or not a predetermined virtual address can be accessed is investigated in a predetermined address space in accordance with the information. If can be accessed, conversion to the corresponding physical address is carried out.

In a case where in Step S11, discrimination is made that the size of a memory region prepared exceeds a table size, discrimination is made whether or not the table size is in the highest hierarchy (Step S14). If it is in the highest hierarchy, the procedure proceeds to Step S12 to acquire a virtual address. if it is not in the highest hierarchy, the procedure proceeds to Step S15 to set the table size to a size covered by 1 entry of a segment table in a hierarchy that is one-layer higher, returning to Step S11. Thereafter, a virtual address is acquired similarly to the process described previously.

Next, a further detailed description will be made using an example of a segment table of 3-hierarchy. Hereupon, 4K-byte page size is used, and the virtual address space is 2 G bytes as an example, and an address is expressed by 32 bits. The maximum bit is always 0 and is not utilized. Segment tables of respective hierarchies cover virtual address conversion of 7 bits from 30 to 34 in a first hierarchy, of 4 bits from 23 to 20 in a second hierarchy, and of 4 bits from 19 to 16 in a third hierarchy. Sizes covered by segment tables of respective hierarchies are that the first hierarchy is 16 M bytes, the second hierarchy is 1 M bytes, and the third hierarchy is 64 K bytes. Accordingly, constants for aligning size of a top virtual address of a region are 16 M, 1 M,and 64 K.

A scenario when a memory region is produced is as follows.

[Step 1]: A virtual address region for a new memory region is acquired from a virtual address administrative apparatus. The virtual address administrative apparatus assigns virtual addresses aligned to 16 K bytes when size of a region produced is not more than 16 K bytes, 1 M byte when more than 16 K but not more than 1 M byte, and 16 M bytes when more than 1 M byte, respectively, as a top of region.

[Step 2]: A physical page for requested size part is secured form a physical page administrative apparatus.

[Step 3]: Next, a page table for holding addresses of a group of physical pages secured is prepared. Region size is also held in a page table.

[Step 4]: The page table produced is held on memory administrative information of a protective space to which the memory region produced belongs. Concretely, the page table is linked to a segment table of hierarchy corresponding to the size aligned. Location to be linked is determined depending upon the virtual address acquired in Step 1. In a case where a segment table necessary for linking is not yet present, a page table is produced prior to linking. For example, a virtual address in a region of 100 K bytes is aligned to 1 M byte, and a page table is linked to the second hierarchy. Supposing that a virtual address is 0x003000000, a page table is linked to a third entry of the first segment table of the second hierarchy. Likewise, a region of 10 K bytes is aligned to 64 K bytes and linked to a segment table of the third hierarchy. With respect to a region of not less than 16 M bytes, a page table is linked to a plurality of entries of a segment table of the first hierarchy. The entry of a segment table has a flag showing holding either nullification, a pointer to a segment table of next hierarchy, or a pointer to a page table. As the procedure for optimization, the flag is mounted with lower 2 bits of entry, which can be combined with pointer data to be received in 1 word.

Figure 4:
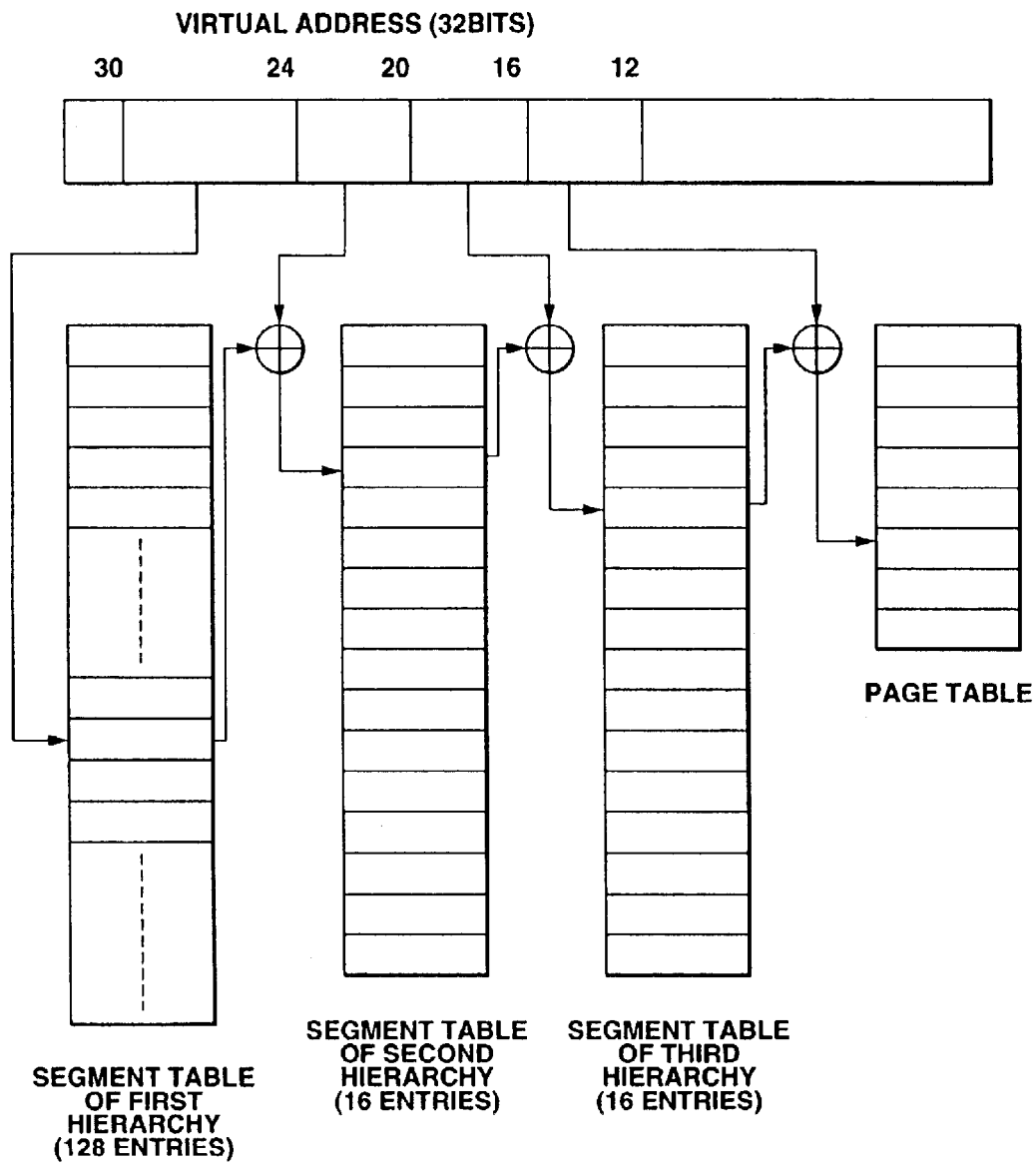
FIG. 4 is a view for explaining address conversion of a segment table.

In the following, a scenario in process at exception of address conversion will be described with reference to FIG. 4.

[Step 1]: A segment table of a protective space to which an object creating exception of address conversion belongs is obtained. With 7 bits from bit 30 to 24 of a virtual address creating exception as index, entry of a first hierarchy of a segment table is investigated. For example, if 0x12345678, the 18$^{th}$ entry is investigated.

[Step 2]: In a case where the flag of this entry shows nullification, a page table corresponding to an exceptional address is not present, thus returning an error.

[Step 3]: In a case where the flag indicates a pointer to a page table, it is compared with size of a page table with bit 20 to 12 as index. When the index is larger, a page table corresponding to the address is not present, thus stopping the process to return an error. When not more than size, address conversion is carried out with entry corresponding to a page table as physical address.

[Step 4]: In a case where the flag indicates a pointer to a segment table of next hierarchy, bit 23 to 20 of exceptional address is added to the pointer as index to obtain table entry of the second hierarchy. In a case where the exceptional address is 0x12345678, index of the second hierarchy is 3.

[Step 5]: Likewise, the second and third hierarchies are searched till a page table entry is found or error.

Further, in a normal page table, a physical address every page is held, but with respect to an I/O region or a memory region secured as a physically continuous page, a page table for holding only a top physical address and size is prepared. Further, information indicative of being optimized is recorded in the page table. At exception of address conversion, in a case where a page table showing the virtual address is optimized, a difference between the exceptional address and the top address is added to a top physical address to obtain a physical address of the page. Thereby, in a case where a region of 1 M byte is prepared, about 1 K byte is necessary in a normal page table, but 8 bytes will suffice in this procedure. The page table preparing time is considerably reduced because the memory acquiring time and the entry initializing time of a page table can be saved, assume a given value irrespective of sizes.

There is shown an example of an Application Programming Interface (API) for acquiring a physically continuous page. This is, for instance, an example of Aperios OS (Trademark of Sony Co., Ltd.) of Sony Co., Ltd. In this example, when a memory region is acquired using the following API, a physically continuous memory is assigned, and optimization of the above-described page memory is optimized.

sError New Contiguous Memory Region (
  Size-t size,
  Memory Protection Info Info,
  bool cache,
  Memory Region ID*mem Region ID,
  void**physAddr,
  void**baseAddr);
sError New External Memory Region (
  Size-t size,
  void**physAddr,
  Memory Protection Info Info,
  bool cache,
  Memory Region ID*mem Region ID,
  void**baseAddr);

Further, also in a case where a memory region is acquired using the following API, a physically continuous memory is assigned, if possible, and optimization of a page table can be carried out.

sError New Contiguous Memory Region (
  Size-t size,
  Memory Protection Info Info,
  Memory Region ID*mem Region ID,
  void**baseAddr).

There can be assured that by the procedure as described above, a page table of a predetermined region is received in one page table without fail, as shown in FIG. 1. A large size region can be linked directly to a segment table of an upper hierarchy. A using memory can be considerably saved as compared with that the table is divided into a plurality of page tables to require a plurality of segment tables. Since hierarchies to be searched can be reduced, it is contributed also to higher speeds. Further, since a top of an address covered by a segment table entry coincides with a top address without fail, at the time of address conversion, it is possible to discriminate whether or not the page is effective by comparing sizes. The memory can be saved for a part that a null page need not be held.

As other advantages, in this procedure, costs for renewal of segment tables when the memory region is opened or re-used become considerably low. Since page tables of respective regions are linked at one to one to 1-entry of segment tables, opening and re-using of the memory region can be carried out merely by deleting or setting the link. Thereby, sError New External Memory Region (
  Size-t size,
  void**base Addr)

Figure 3:
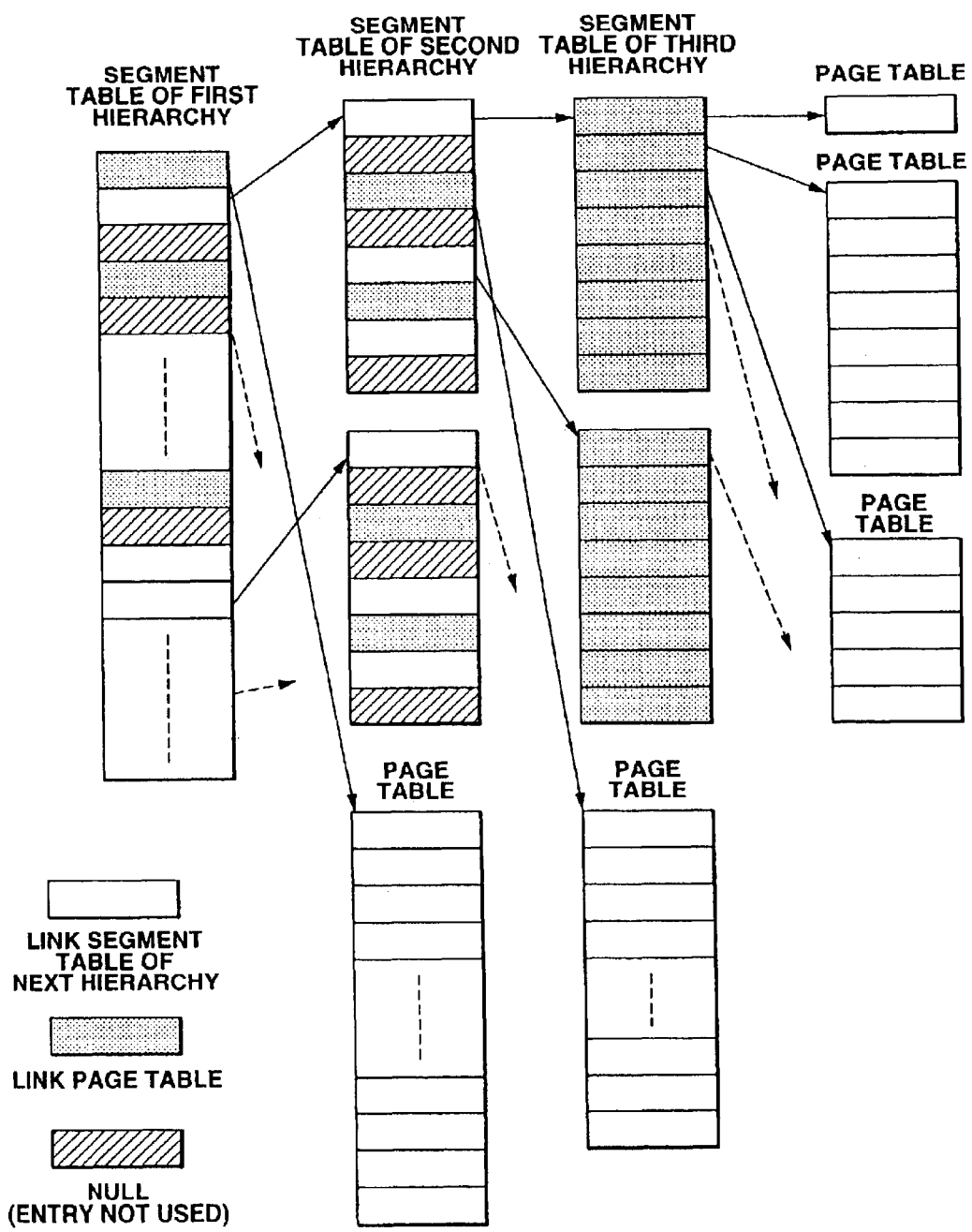
FIG. 3 is a view for explaining memory administrative information.

There can be assured that by the procedure as described above, a page table of a predetermined region is received in one page table without fail irrespective of size, as shown in FIG. 3. A large-size region can be linked directly to a segment table of an upper hierarchy. The using memory can be saved considerably as compared with one that is divided into a plurality of page tables to require a plurality of segment tables. Hierarchies to be searched can be reduced, thus also contributing to higher speeds. Further, since a top of an address covered by segment table entry coincides with a top address of a memory region, it is possible to discriminate, at the time of address conversion, whether or not the page is effective by comparing sizes. Memory can be saved for a part that need not to hold a null page entry.

As a further advantage, in this procedure, renewal costs of a segment table at the time of opening and re-using of a memory region are reduced considerably. Since page tables of respective regions are linked at 1 to 1 to 1-entry of a segment table, opening and re-using can be carried out merely by deleting and setting the link. Thereby, data transfer between objects making use of page transfer is carried out at high speeds. In the conventional procedure, the regions extend over a plurality of page tables or cases where a plurality of regions belong to a page table need be considered, thus being low speeds.

Further, since in the present procedure, a page table can be placed in independence, a page table of a common memory region can be owned jointly by a segment tale of a plurality of protective domains to reduce the memory using amount.

Figure 5:
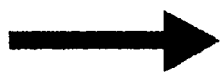
FIG. 5 is a view for explaining optimization of a page table for a memory region having a physically continuous name page.

In connection with a memory region (including an I/O region) comprising a physically continuous page, only the top physical address and size of a region may be held as shown in FIG. 5, thus capable of making a page table small. For actuating a device driver in a memory protective environment, it is necessary to map the I/O region in a memory protective space of a driver program to enable access in a virtual address. In a case where a huge memory region as in a frame buffer is administered by a procedure similar to a normal memory region, there poses a problem that a page table becomes huge, and of costs for initializing page table entries, which is however solved by the present procedure.

Industrial Applicability

As described above, by using the present invention, it is possible to reduce the memory amount used for a segment table and a page table, and at the same time, to lower costs at the time of preparing and deleting memory regions. Furthermore, with respect to the physically continuous memory region, it is possible to avoid that size of a memory region of a page table becomes huge.

What is claimed is:

1. A memory protective administrative apparatus for a computer for using a page table and a segment table of a multi-hierarchy or a single hierarchy to protect and administer memory regions, wherein when a protected memory region is produced in response to a memory assigning request, a virtual address is assigned to said protected memory region so as to have a multiple of size of an address covered by 1-entry of a segment table of a predetermined hierarchy out of segment tables of said multi-hierarchy, and size closest to said memory region, or a multiple of size covered by 1-entry of said segment table of a single hierarchy, a page table for administering the correspondence between the virtual address assigned to said memory region and a physical page is produced, the page table being linked to an entry of said segment table of a predetermined hierarchy or an entry of said segment table of a single hierarchy by the assigned virtual address; and wherein the page table holds a size of the corresponding memory region and compares sizes at the time of research to discriminate whether or not the page is effective.

2. The memory protective administrative apparatus according to claim 1 wherein the page table has no entry of a page table of a null page portion out of addresses covered by 1-entry of a segment table to which said page table is linked.

3. The memory protective administrative apparatus according to claim 1 wherein when a common memory is realized, a page table at every common memory region is owned jointly between a plurality of protective domains.

4. The memory protective administrative apparatus according to claim 1 wherein a page table of a memory region comprising a physically continuous page holds, in place of having correspondence between a virtual address at every page and a physical address, only a top virtual address of a memory region, a top physical address and size, and at the time of address conversion, a difference between a virtual address desired to be converted and a top virtual address is added to the top physical address to thereby convert it into a corresponding physical address.

5. The memory protective administrative apparatus according to claim 4 wherein the page table holds only the top physical address and the size, and the top virtual address is obtained from a position of a segment table linked.

* * * * *